(12) United States Patent
Holz et al.

(10) Patent No.: US 6,994,458 B2
(45) Date of Patent: Feb. 7, 2006

(54) VEHICLE HEADLIGHT AND PROCESS FOR OPERATION THEREOF

(75) Inventors: Michael Holz, Senden (DE); Joerg Moisel, Neu-Ulm (DE); Manfred Rode, Senden (DE)

(73) Assignee: DaimlerChrysler AG, (DE)

( * ) Notice: Subject to any disclaimer, the term of this patent is extended or adjusted under 35 U.S.C. 154(b) by 50 days.

(21) Appl. No.: 10/722,001

(22) Filed: Nov. 25, 2003

(65) Prior Publication Data

US 2004/0105276 A1    Jun. 3, 2004

(30) Foreign Application Priority Data

Nov. 29, 2002  (DE)  ................. 102 56 102

(51) Int. Cl.
*B60Q 1/00*     (2006.01)
*B60Q 1/12*     (2006.01)

(52) U.S. Cl. .............. 362/465; 362/464; 362/513; 362/526

(58) Field of Classification Search ........ 362/464–468, 362/508, 512, 267, 513, 526; 313/635; 315/83
See application file for complete search history.

(56) References Cited

U.S. PATENT DOCUMENTS

| 4,486,688 A | * | 12/1984 | Schmitz .................. 315/83 |
| 6,467,940 B2 | | 10/2002 | Eschler et al. |
| 2005/0040768 A1 | * | 2/2005 | Kato et al. .................. 313/635 |

FOREIGN PATENT DOCUMENTS

| DE | 40 40 264 A1 | | 6/1992 |
| DE | 43 35 244 A1 | | 6/1995 |
| DE | 29609267 U1 | * | 5/1996 |
| DE | 100 27 029 A1 | | 12/2001 |

* cited by examiner

*Primary Examiner*—Thomas M. Sember
*Assistant Examiner*—James W Cranson, Jr.
(74) *Attorney, Agent, or Firm*—Pendorf & Cutliff

(57) ABSTRACT

The invention concerns a process for operation of a vehicle headlight as well as a vehicle headlight (1) with a housing and a light source (3) provided within the housing. In accordance with the invention the housing of the vehicle headlight (1) is designed to be pressure-tight and the headlight (1) is associated with a controller (7), which controls the headlight (1) depending upon the pressure within the housing. The controller (7) brings about that the headlight, depending upon the pressure within the housing, is switched off, is adapted in its light intensity and/or is changed in its emission characteristic. Thereby a headlight is produced characterized by being safe for the eyes.

13 Claims, 2 Drawing Sheets

VEHICLE HEADLIGHT AND PROCESS FOR OPERATION THEREOF

BACKGROUND OF THE INVENTION

1. Field of the Invention

The invention concerns a headlight for vehicles and a process for operation of a vehicle headlight.

2. Description of the Related Art

German Patent Application DE 100 27 018 A1 discloses a headlight for a vehicle, comprising a housing and a light source housed within the housing, which emits visible and non-visible infrared light. The light source employed therefore is a gas discharge lamp or an incandescent light, which emits both visible and non-visible light. Optical elements in the form of reflectors and lenses are used to specifically direct light to illuminate the environment of the vehicle. These headlights have the problem that their high intensity light emissions represent a danger to the eye.

A headlight for a vehicle is described in DE 43 35 244 A1 which, in order to provide safety for eyes, is provided with collection lenses having a large surface area, with microlenses associated therewith in the beam path, so that the headlight light emission surface is as large as possible. This type of design of headlight is however not well suited for allowing an optimal design for a vehicle.

SUMMARY OF THE INVENTION

It is a task of the invention to provide a headlight and a process for operation of a headlight for a vehicle, which provide sufficient eye safety.

This task is solved by a headlight with the characteristics of Patent Claim 1 and a process for operation of a headlight with the characteristics of Patent Claim 9.

Advantageous improvements of the invention are set forth in the dependent claims.

The invention is based upon the recognition, that a substantial cause for eye damage and therewith the damager potential to the eyes is caused thereby that the light from the high intensity light source impinges directly upon the retina of a pedestrian or other traffic participant, or after passing through a distorted housing of a headlight, and thereby damages the eyes. In order to minimize this danger, the invention undertakes to monitor the headlight for intactness and an undamaged condition. For this, the housing of the headlight is made pressure-tight and thereby the possibility is created for monitoring the internal space of the housing for a pressure or vacuum. If the pressure drops or the vacuum is lost and the internal pressure equalizes with the environment, then it can be concluded therefrom that a loss of integrity exists in the housing, which allows a conclusion of damage or defect of the housing. Depending upon this recognition the headlight is then so controlled, that a danger to the eyes through the damaged headlight is reduced to the extent possible.

This can be accomplished for example thereby that the light output of the light source is reduced or, as the case may be, the light source is switched off, or the emission characteristic of the headlight is so changed, that a risk of blinding of other traffic participants is noticeably reduced. For example, the emission characteristic can be changed to the extent that the light cone is shifted towards the ground and therewith no large range of the headlight beam exists. This then has the consequence, that at a certain distance from the light cone, as a result of this controlling, the height is no longer reached and a pedestrian would no longer be so intensely blinded. Thereby it is also possible to provide a smooth transition between light and dark boundary such that the expected height of the eyes of a traffic participant is now only impacted with a significantly reduced light intensity and therewith a blinding or damaging effect of the emitted light is significantly reduced.

By this inventive design of the headlight with a control which controls the headlight depending upon the pressure within the housing, an increased measure of eye safety and therewith a lower risk of danger to traffic participants by blinding, and also in the use of non-visible light in particular infrared light, a reduction of the damaging effect of light on the eyes or as the case may be the optical nerves is accomplished. This results in a substantially safer headlight and to a broader acceptance of headlights, which emit non-visible, in particular infrared light.

This type of headlight is of particular significance for devices for improving visibility, which are referred to for example as night vision devices. These night vision devices are characterized by an active infrared light illumination via this type of headlight. The infrared light reflected from illuminated objects is recorded by a camera which is sensitive to the frequency range of infrared light and is provided to the vehicle operator or other occupants either directly or subsequent to image processing. The image information of the night vision device supplements the information available based on vision, for example through the windshield, and improves by the supplementing effect the view of the vehicle operator or occupants. For this type of system it is of particular importance, that an endangerment of other traffic participants is prevented to the extent possible.

Therewith it becomes clear, that the inventive headlight is of particular importance when using a light source which emits infrared non-visible light exclusively or in combination with visible light. Thereby it has been found to be advantageous to employ as light sources one or more semi-conductor light sources, which are assembled into arrays and therewith produce a very high intensity headlight emission. Due to this very high output headlight the basic danger potential is high, so that appropriate precautions for improving the safety to vision becomes necessary, which is provided by the inventive headlight.

Particularly preferred semi-conductor light sources include infrared lasers, infrared LEDs by themselves or in combination with appropriate semi-conductor components for visible light. Beyond this it has been found desirable in practice, to feed into the pressure-tight housing of the headlight visible or infrared light from a remote light source via a light guide, which light source may be a very high powered laser, and to employ these for illumination of the environment of the headlight.

Beyond this it has been found desirable to control the controller depending upon the deviation from an intended pressure, which is predetermined or corresponds to the ambient pressure, or alternatively based upon the rate of pressure change within the housing. Therewith a very reliable predictor or variable is provided for the determination of the integrity of the headlight with the housing. If the pressure changes strongly, that is, either in the absolute value or the rate of change, then a large hole or a strong damage of the headlight is identified, which leads to for example a turning off of the headlight.

If the change is only very small, then it has been found useful to inform the vehicle operator or other vehicle occupants of the damage of the headlight via an indicator unit which can be optical as well as acoustic, so that the vehicle operator is directed to or guided to measures along his way for rectifying the defect, for example by searching for garages for repairing the defect. In order to accomplish this, the controller for the headlight is connected with the output unit in such a manner, that an appropriate signal, a warning signal or directions to look for a garage, for example a multifunction display, is generated and issued. For this the information display already available in many vehicles can be employed. This leads to a safer headlight, which can be changed out, replaced or repaired before a major damage of the headlight and therewith before a major endangerment of traffic participants occurs.

According to a further preferred embodiment of the headlight, this is provided with a pump, which is adapted to produce a predetermined pressure or vacuum in the housing. This pressure or vacuum provides the possibility to reliably detect a desired value predetermined by the pump and in certain cases to reliably detect the rate of change. The desired pressure or vacuum can be routinely produced or restored with the aid of the pump. Therewith the functionality of the headlight is assured in particular measure.

Besides this, with this type of headlight with pump the possibility is accomplished to continuously maintain the desired pressure or vacuum and to obtain information regarding the magnitude of the loss of pressure on the basis of the activity of the pump, and thereby to derive an output signal for controlling the headlight. If the pump is continuously in operation in order to achieve the desired pressure or vacuum, it can be concluded from this that there exists a substantial damage of the housing and therewith the headlight, so that appropriate steps corresponding to this damage, for example turning off of the headlight, can be undertaken. If the activity of the pump is either low in the amount of time or in the output of the pump, such that from this a slight damage can be concluded, for example due to a hairline crack in the front window or lens of the housing, so that a turning off of the headlight is not necessary, then the controller unit of the headlight transmits an appropriate signal to the output unit for warning the vehicle occupants to indicate the necessity of the repair of the damage of the headlight.

As a particularly simple controller for the pressure dependent control of the laser headlight, a pressure switch has been found to be useful, which is triggered in such a manner that in the case of the presence of the desired selected pressure or vacuum in the internal space of the housing the electrical circuit for supplying the headlight is closed, so that via this pressure switch the energy supply to the light source, in particular the laser light source, is enabled, in comparison to which in the case of deviation from the desired pressure the pressure switch is opened and the energy supply to the light source is interrupted and therewith the headlight is turned off. Thereby the pressure switch is so selected and designed that small deviations due to pressure fluctuations and the like do not lead to an interruption of the supply of electricity, in comparison to which significant clear or large deviations, which are associated with damage of the housing, lead to a reliable disconnect. This simple pressure switch represents a passive system for controlling the headlight, which requires no additional electronic control components. This headlight has proven itself to be very economical, robust and reliable in its manner of operation.

Beyond this, it has been found useful to provide a pressure switch in the housing, which is capable of sensing the pressure or vacuum in the internal space of the housing. The result of the pressure detection is supplied to a control unit for additional evaluation or, as the case may be, control of an IR-laser diode as light source, for example for controlling the network connection for the light source which uses the laser light source as light source. By this design of the headlight the possibility is provided to make a very differentiated evaluation of the pressure relationship within the internal space of the housing, for example with respect to the change in speed of the internal pressure, and to provide differentiated control of the headlight, for example in the form of a measured or corresponding or limited reduction in the light output, for example of a laser light source, in particular in the infrared range. This type of inventive headlight has been found to be very safe and to react differentially depending upon the existing external conditions. An unnecessary premature total turning off of the headlight can be avoided by this differentiated control, so that this headlight has been found to be very reliable.

The inventive vehicle headlights can be front headlights, trunk lights, curb lights, blinkers, rearward lights, rear fog lights as well as forward fog lights.

BRIEF DESCRIPTION OF THE DRAWINGS

In the following the invention will be described in greater detail on the basis of two preferred illustrated embodiments.

DETAILED DESCRIPTION OF THE INVENTION

Figure 1:
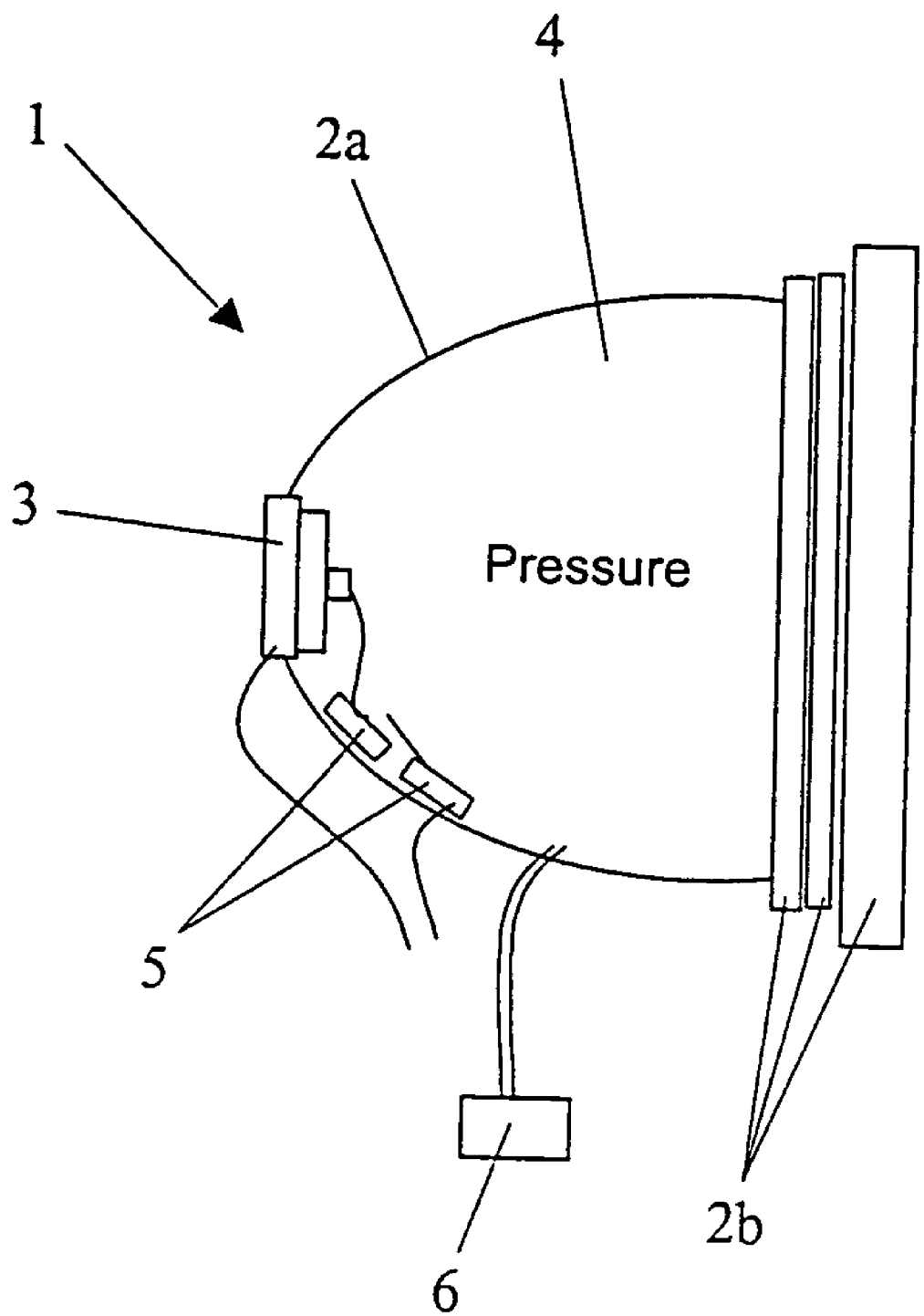
FIG. 1 shows a headlight with housing and pressure switch.

The headlight 1 shown in FIG. 1 includes a housing, which includes a reflector 2a and a multistage front window 2b. A mount for the laser light source 3 is integrated in the housing. The housing is pressure-tight, so that pressure is continuously maintained within the internal space 4 of the housing. If the front window 2b, which is comprised of multiple optical elements, a diffuser plane, a Fresnel lens and a glass disc, is damaged by the impact of a stone, then the internal space 4 of the headlight 1 is no longer separated from the environment in pressure tight manner. The pressure will conform to the environmental pressure.

If the internal space 4 is pressurized, then the pressure switch 5 located within the housing inner space is closed by the pressure so that the laser light source 3, which is supplied by energy through the pressure switch 5, is operable. If the pressure drops, then the pressure switch opens according to its design and the energy supply for the laser light source 3 is interrupted. Therewith a very safe control of the headlight is produced, which upon occurrence of a defect in the front window 2b results in switching off of the laser light source 3, and therewith there is prevented an endangerment of other traffic participants by the laser light, which produces a very intense high power light, through the damaged front window 2b, without its protective characteristics. This so much the greater if the laser light source 3 is an infrared laser diode, which transmits very intense, high power beams in the non-visible light range, which are not seen by the traffic participants and therewith do not result in a protective reflexive by closing of the eyes or a turning away of the face.

This described headlight 1 is characterized as being a very simple, robust and economical headlight which provides a particular measure of eye safety. The vehicle headlight 1 is associated with a pump 6, which establishes during operation of the headlight 1 the desired pressure in the internal space 4 of the headlight 1. Thereby it is ensured that during a long period of inoperation of the vehicle or during a long period of nonuse of the headlight 1 a drop in the pressure inside the headlight 4 through the housing or possible internal spaces between the components of the housing does not automatically become detected as defect in the headlight 1, rather, the functionality of the inventive headlight is assured even under this type of condition. A small pressure loss, which is not associated with a defect or a loss of integrity of the headlight, can be excluded as cause for the loss of function of the headlight, in particular the control of the headlight.

Figure 2:
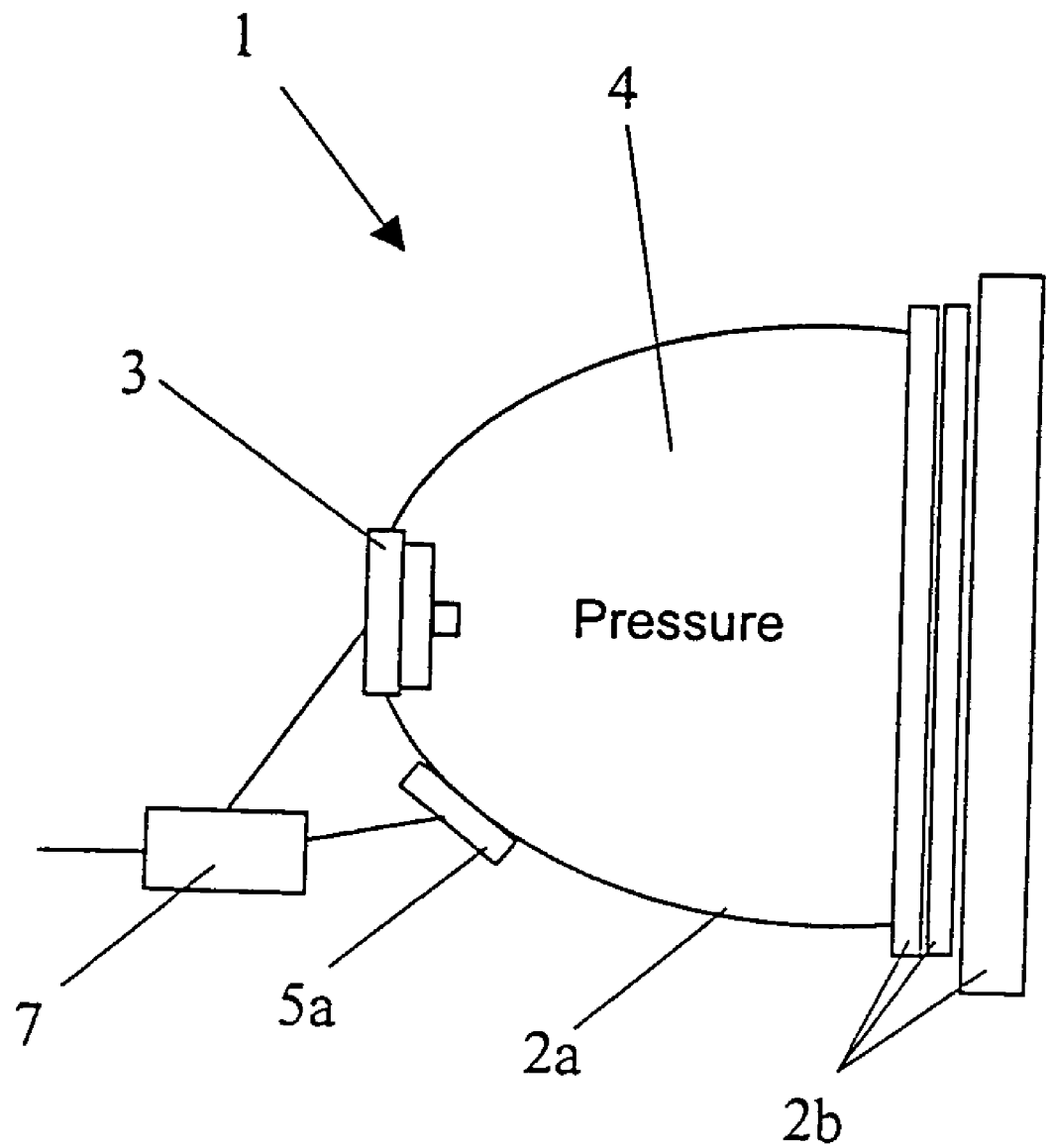
FIG. 2 shows a headlight with pressure sensor.

The inventive headlight 1 represented in FIG. 2 shows a corresponding condition of the headlight represented in FIG. 1. In order to avoid repetition, in the following only the substantial differences are described. In place of the pressure switch 5, in the second headlight 1 a pressure sensor 5a is provided on the outer wall of the reflector 2a. This is adapted to detect or determine the pressure in the inner space 4 of the headlight 1. The determined pressure signal is conveyed to a control unit 7. This control unit 7 evaluates the pressure signal as to fluctuations, changes or, as the case may be, the type of the changes of the pressure in the internal space 4 of the headlight 1. If these changes are large, then this is detected by the control unit 7 and—depending on a decision logic recorded there in—the energy supply for the light source 3 is interrupted. This occurs via a network component for energy supply of the laser diode 3 connected to the control unit 7. By the use of a switched network the interruption of the energy supply of the laser light source 3 can be realized very simply and therewith a failure of the interruption of the output of the laser light in particular the infrared laser light can be reliably avoided.

Beyond this, the control unit 7 is capable of identifying slight changes, which permit a conclusion of a fine crack in the front window 2b of the headlight, and to control the network such that the laser light source only emits a portion, in particular a half of its possible light output, so that a reduction of the emitted light power is achieved, which again reduces the danger of eye damage or other damage to other traffic participants. Therewith the headlight described in FIG. 2 with control unit 7 is capable of reacting differentially to various pressure changes and therewith to reach the right decision according to the situation for switching off the headlight, including reduction of the light output or continuing light output in the case of minimal pressure fluctuations. This leads to a very reliable safe headlight.

What is claimed is:

1. An automotive vehicle headlight with housing and with a light source provided within the housing, wherein:
    the housing is a pressure-tight housing,
    the headlight is associated with a controller which controls the headlight based on the pressure within the housing, and
    the headlight is switched off, is modified in its light intensity and/or is changed in its emission characteristic depending upon the housing internal pressure.

2. The headlight according to claim 1, wherein the controller controls the light source based on the pressure within the housing.

3. The headlight according to claim 1, including means to supply information regarding pressure or rate of pressure change within the headlight housing to the controller, and wherein the controller is programmed to control the headlight emissions based upon detecting a deviation from an intended pressure value or exceeding of a rate of pressure change.

4. An automotive vehicle headlight with housing and with a light source provided within the housing, wherein:
    the housing is a pressure-tight housing,
    the headlight is associated with a controller which controls the headlight based on the pressure within the housing, and
    the headlight is associated with an output or a display unit for the vehicle occupants, which warns or informs the vehicle occupants of the headlight condition based on the pressure within the housing.

5. An automotive vehicle headlight with housing and with a light source provided within the housing, wherein:
    the housing is a pressure-tight housing,
    the headlight is associated with a controller which controls the headlight based on the pressure within the housing, and
    the light source of the headlight is a single semi-conductor light source or an array of high intensity semi-conductor light sources.

6. The headlight according to claim 5, wherein the high intensity semi-conductor light sources are laser light sources.

7. The headlight according to claim 5, wherein the semi-conductor light source(s) emit visible and/or infrared light.

8. An automotive vehicle headlight with housing and with a light source provided within the housing, wherein:
    the housing is a pressure-tight housing,
    the headlight is associated with a controller which controls the headlight based on the pressure within the housing, and
    the headlight is provided with a pump, which is adapted for producing a predetermined pressure or vacuum within the housing.

9. The headlight according to claim 8, including means for driving the pump to establish a predetermined pressure or vacuum in the housing, and wherein the controller is programmed to control the headlight on the basis of the activity of the pump.

10. An automotive vehicle headlight with housing and with a light source provided within the housing, wherein:
    the housing is a pressure-tight housing,
    the headlight is associated with a controller which controls the headlight based on the pressure within the housing, and
    the controller is a pressure-sensitive switch.

11. A process for improving the safety of operation of a headlight in the case that the headlight housing becomes damaged, the headlight comprising a light source provided within a housing, the process comprising:
    sensing the pressure within the housing,
    relaying the sensed pressure to a controller associated with the headlight which controls the headlight based on the pressure within the housing, thereby controlling of the headlight emission depending upon the pressure within the housing.

12. The process according to claim 11, wherein the headlight is switched off, is adapted in its light intensity and/or is modified in its emission characteristic depending upon the housing internal pressure.

13. The process according to claim 11, comprising
    driving a pump to establish a predetermined pressure or vacuum in the housing,
    using a controller to control the headlight on the basis of the activity of the pump.

* * * * *